Patented Dec. 28, 1937

2,103,849

UNITED STATES PATENT OFFICE 2,103,849

METHOD OF MAKING GLYCOLS

Joseph R. Heard, Jr., New York, N. Y., assignor to Cesare Barbieri, New York, N. Y.

No Drawing. Application June 1, 1936, Serial No. 82,679½

7 Claims. (Cl. 260—156.5)

The present invention relates to a method of making glycols, and particularly to a method of making glycols from unsaturated hydrocarbons contained in a mixture of gases obtained as a byproduct of vapor phase petroleum cracking processes.

Heretofore, glycols have been made from undiluted, unsaturated hydrocarbon gases. Usually the pure hydrocarbon gas was used. The purification of such gases as ethylene was expensive and the yield of chlorohydrin was limited. The solution of chlorohydrins produced in the first step of the conventional processes was dilute and usually did not contain more than about 7% of the chlorohydrin. This in itself increased the cost of operation as did the expense of producing pure unsaturated hydrocarbon gas. Furthermore, in halogenating the unsaturated hydrocarbon considerable heat was generated which required the use of expensive cooling devices or the reduction of the speed of operation. The reaction products were of a corrosive nature and when handled in the conventional way caused considerable destruction of metal equipment. For these and other reasons known to those skilled in the art, no method, as far as I am aware, has been proposed which has been wholly satisfactory and successful when carried into practice on an industrial scale for the production of commercial products.

I have discovered a process which overcomes the difficulties of the prior art and which provides a wholly satisfactory and efficient method for manufacturing glycols on a practical basis.

It is an object of the present invention to provide a method of producing a more concentrated solution of chlorohydrins than ordinarily produced by conventional methods.

It is another object of the present invention to produce simultaneously a plurality of glycols from a gas mixture containing not only unsaturated hydrocarbons but also saturated hydrocarbons.

It is a further object of the present invention to provide a method of making glycols starting with inexpensive raw materials like gas mixtures of saturated and unsaturated hydrocarbons such as a mixture obtained as byproducts of vapor phase cracking processes of the petroleum industry.

The present invention also contemplates a process for making chlorohydrins and alkylene chlorides simultaneously and continuously.

Other objects and advantages of the invention will become apparent from the following description.

Broadly stated, the invention contemplates passing gas containing a mixture of unsaturated hydrocarbons in the presence of inert gas diluents, such as saturated hydrocarbons, into the lower portion of a tower filled with water and simultaneously passing chlorine into the tower to contact said water and hydrocarbons. Cold water is preferably fed into the top of the tower and a water solution containing reaction products is continuously drawn off at the base of the tower as the concentration of chlorohydrins reaches the desired level, say 15 to 20%, which is preferably more than the 7% maximum prior art concentration regularly obtained in conventional commercial operations. The chlorohydrins include those of ethylene, propylene and butylene. It has been discovered that each of these chlorohydrins or a mixture of them forms with water a constant boiling mixture boiling about 96° C. that can easily be separated from the hydrochloric acid which is formed simultaneously with said chlorohydrins. Such a chlorohydrin mixture is subsequently converted into a mixture of glycols which serves as a better anti-freeze mixture for use with automobiles than pure glycol.

The following equations are probably illustrative of the reactions which take place.

(Ia) $C_nH_{2n} + Cl_2 + HOH = C_nH_{2n} \cdot Cl \cdot OH + HCl$

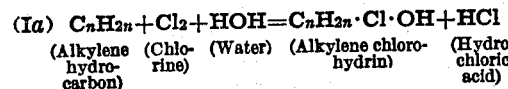

(Ib) $C_nH_{2n} + Cl_2 = C_nH_{2n}Cl_2$

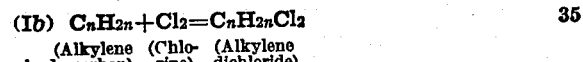

(II) $2C_nH_{2n} \cdot Cl \cdot OH + Ca(OH)_2 =$

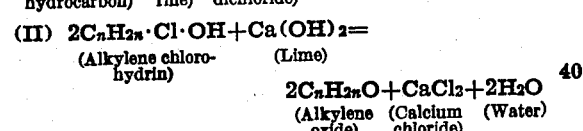

$2C_nH_{2n}O + CaCl_2 + 2H_2O$ (III) $2C_nH_{2n}O + 2HOH = 2C_nH_{2n}(OH)_2$

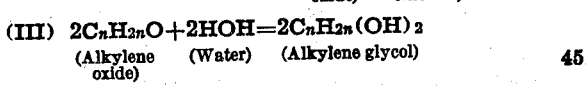

For the purpose of giving those skilled in the art a better understanding of the invention, the following description of a preferred procedure of carrying the invention into practice will be given.

A gas mixture containing unsaturated hydrocarbons (alkylenes) and an inert gas, such as saturated hydrocarbons, and preferably a mixture of cracked gases obtained from a petroleum cracking operation such as the well-known "gyro" gas is passed into a tower of suitable height, say about 5 feet. This tower is filled with water and is provided with an inlet for fresh cold water and an outlet for a water solution containing the reaction products. It is preferred to use a tower with its accessories, such as is described in the co-pending application, Serial No. 91,244 filed July 17, 1936.

A typical gas mixture containing olefines, paraffins, etc., has the following composition:—

|  | Per cent |
|---|---|
| Methane and hydrogen | 42.5 |
| Ethane | 18.8 |
| Propane | 5.7 |
| Butanes and higher | 0.7 |
| Ethylene | 20.6 |
| Propylene | 11.0 |
| Butylene and higher | 0.7 |
|  | 100.0 |

It will be noted that a gas such as the above carries approximately 32.3% unsaturates, but gases with as little as 10% unsaturates can be used. The remainder of the gas constituting primarily saturated hydrocarbons, instead of being detrimental to the method, actually has been found to be beneficial to the process.

In practice, it is preferred to pass the gas into the tower at the lower region thereof at a point about one fifth of the height of the column from the base. The chlorine enters the column a short distance, say about four inches (for a 5 ft. column), above the hydrocarbon gas inlet. Both streams of gas are preferably introduced into the water in the tower through porous thimbles of alundum or sintered glass or through any similar device for obtaining small bubbles and a fine and uniform dispersion of the reactants. Water, preferably having a temperature of about 5° C. to about 20° C. is fed to the top of the tower continuously and a solution containing a mixture of chlorohydrins and alkylene chlorides is drawn off at the base of the tower while the saturated hydrocarbons or other gas diluents and chlorine in traces pass out of the top of the tower through a suitable outlet. It was found that propylene and butylene react more rapidly than ethylene to form chlorohydrins and that the chlorination should be continued until approximately all of the ethylene has reacted.

If desired the relatively tall column may be dispensed with and in its place one or more short columns used provided these are so stirred that the bubbles of hydrocarbon and chlorine gases are kept small and finely dispersed in the aqueous medium.

The mixture of chlorohydrins and of alkylene chlorides in aqueous solution is conveyed to a steam still where the alkylene chlorides are steam distilled off with about 5% of the water of the charge and then the chlorohydrins are steam distilled off. These two distillations may be carried on as continuous operations. Water and chlorohydrins form an azeotropic mixture boiling at about 96° C. which can easily be separated from the hydrochloric acid solution.

The chlorohydrin solution is run into hot milk of lime heated to above 80° C., preferably about 90° C. The exact amount of lime present is not important but it is sufficient to have an excess, say 25%, over that required to neutralize the hydrochloric acid which is split off. The concentration of the milk of lime solution or the solution of other alkaline earth oxide and/or hydroxide is relatively low. That is, a dilute solution of the hydroxide is used in the presence of undissolved hydroxide. The milk of lime is made with about 50 parts of lime suspended in about 100 parts of water. Of course, only a dilute solution of the alkali is present since only about 0.1% of the lime is soluble under these conditions but the excess has a buffer effect and keeps the pH of the solution almost constant. The reaction between the chlorohydrin, the water, and the lime requires only a few seconds and is soon complete.

The resulting alkylene oxides are then passed into about 0.5% acid in the presence of which the alkylene oxide hydrolyzes to form the glycol. The temperature of the hydrolysis is kept below about 50° C., preferably at about 20° C. The separation of the resulting glycols is accomplished, when sulfuric acid is used, by precipitating the sulfuric acid with lime or marble or limestone or other suitable compound to remove the acid. The solution of glycols containing the acid as a precipitate is filtered and the filtrate evaporated and if desired distilled. Yields of glycols based on the chlorohydrins used vary from about 70 to about 85% depending on conditions and yields of the chlorohydrins based on the hydrocarbons are about 90%.

To insure a complete reaction of all the alkylenes the reaction is carried out until substantially all the ethylene is changed into the corresponding chlorohydrin. It has been found satisfactory to pass the gases into the cold water through alundum or sintered glass thimbles in order to insure a complete reaction, efficient stirring, and solution of the reaction products in the solvent. The passage of the gas streams through the porous thimbles insures that the streams will be sub-divided into small bubbles and dispersed in a very fine state of subdivision.

The presence of saturated hydrocarbons, such as paraffins or other inert gases, dilutes the reacting gases and assists in keeping the reaction temperature within the optimum range. In addition, since the hydrocarbon gases are dry, i. e. free from water, there is a certain amount of water evaporated thereby producing some cooling at the point where it is needed due to the latent heat of the evaporation by such a scheme. Agitation of the liquid by mechanical methods is unnecessary since the inert gases act as strong and effective stirring agents.

The aqueous chlorhydrin-alkylene chloride solution drawn from the base of the reaction tower is conveyed to a still and continuously steam distilled and thereby the alkylene chlorides removed. The amounts of alkylene chlorides formed by my procedure are ordinarily quite small. The chlorohydrins are then distilled into a separate receiver. The chlorohydrins are then run into a hot suspension of alkaline earth oxide. The alkaline earth oxide neutralizes the hydrochloric acid split off and the resultant alkylene oxides are passed into dilute acid in the presence of which the alkylene oxides hydrolyze to the corresponding glycols. Alternatively, when the concentration of chlorohydrins in the solution is as high as 15% distillation may be omitted and the aqueous solution run into the milk of lime at once to form the alkylene oxides. With such procedure more milk of lime must be used because of the extra acid present which must be neutralized.

The mixed glycols are separated from the acid in solution by any suitable means known to those skilled in the art. The glycol solution, substantially free of acid, is then evaporated and may be distilled to separate the pure glycols, if desired.

It is to be understood that by the use of the term "alkaline earth oxide", I wish to include not only the oxide in the narrow sense of the combination of the alkaline earth and oxygen, but also the broader sense of the combination of it with water or carbon dioxide. For example, such materials as calcium oxide, calcium hydroxide, magnesium hydroxide or barium carbonate are included in my classification.

I claim:

1. The process of manufacturing a mixture of glycols which comprises continuously passing finely dispersed gases containing alkylenes from a vapor phase cracking of petroleum into water at a temperature below 20° C., continuously passing finely dispersed chlorine into said water to form chlorohydrins and alkylene chlorides, drawing off a solution containing below 20% chlorohydrins of said gaseous alkylenes, conveying said solution of chlorohydrins to distilling equipment, continuously removing alkylene chlorides and chlorohydrins by steam distillation into separate receivers, passing said chlorohydrins into a suspension of lime of about 50 parts of lime in about 100 parts of water heated to about 80° C., hydrolyzing said chlorohydrins to alkylene oxides and neutralizing hydrochloric acid produced by said hydrolysis, continuously passing said alkylene oxides into about 0.5% sulfuric acid at about 20° C., to form glycols, adding a calcium compound to precipitate said sulfuric acid as calcium sulfate, filtering off said sulfate and continuously evaporating said substantially sulfuric acid free solution of glycols whereby mixed glycols of the alkylenes are produced.

2. The process of manufacturing mixed glycols which comprises continuously passing finely dispersed gaseous olefines and inert gases into a flowing body of water at a temperature below about 10° C., simultaneously passing chlorine into said body of water to react with said olefines, removing water soluble reaction products, conveying said soluble reaction products to a steam still, continuously separating lower boiling point reaction products and chlorohydrins from each other and from said water, continuously passing chlorohydrins into a hot dilute solution of lime containing solid lime, reacting said chlorohydrins to produce alkylene oxides, continuously passing said oxides into dilute sulfuric acid at about 20° C., to form glycols, removing said sulfuric acid and continuously evaporating said substantially sulfuric acid free solution of glycols whereby alkylene glycols are obtained.

3. The process of manufacturing mixed glycols which comprises passing finely dispersed dilute gaseous olefines and chlorine into cold water to form chlorinated reaction products of said alkylenes, removing water soluble reaction products, adding cold water, conveying said reaction products to a steam still, distilling off about 1/10 of the volume of the still charge to remove and recover alkylene chlorides, distilling off chlorohydrins, passing said chlorohydrins into a dilute solution of an alkaline earth oxide containing undissolved oxide, reacting said chlorohydrins to form alkylene oxides, passing said alkylene oxides into dilute mineral acid at a temperature not higher than about 50° C., to form a solution of glycols, removing said mineral acid, evaporating said substantially mineral acid free solution of glycols whereby alkylene glycols are produced.

4. The process of manufacturing mixed glycols which comprises reacting chlorine with dilute alkylenes in the presence of water at a temperature of about 10° C., to form chlorohydrins and chlorides, separating said chlorides from said chlorohydrins, forming alkylene oxides from said chlorohydrins in the presence of an alkaline earth oxide, reacting said alkylene oxides in the presence of a dilute mineral acid to form glycols and recovering said glycols whereby alkylene glycols are obtained.

5. The process of manufacturing glycols which comprises reacting chlorine and alkylenes in the presence of water to form alkylene chlorides and chlorohydrins, subjecting said chlorohydrins to hydrolysis to form alkylene oxides in the presence of a dilute solution of an alkaline earth oxide, reacting said alkylene oxides to form glycols and recovering said glycols whereby glycols of the alkylenes are obtained.

6. The process of manufacturing mixed glycols which comprises reacting chlorine with dilute alkylenes in the presence of water at a temperature of about 10° C., to form a solution of chlorohydrins and chlorides, contacting said solution of chlorohydrins and chlorides with an excess of an alkaline earth oxide, to form alkylene oxides, reacting said alkylene oxides in the presence of dilute mineral acid to form glycols and recovering said glycols whereby alkylene glycols are obtained.

7. The process of manufacturing mixed glycols which comprises reacting an acid solution of alkylene chlorohydrins with a buffered solution of an alkaline earth oxide to form alkylene oxides, reacting said alkylene oxides to form glycols in the presence of dilute mineral acid, and recovering said glycols whereby glycols of the alkylenes are obtained.

JOSEPH R. HEARD, Jr.